(12) United States Patent
Parker et al.

(10) Patent No.: US 10,845,871 B2
(45) Date of Patent: Nov. 24, 2020

(54) INTERACTION AND MANAGEMENT OF DEVICES USING GAZE DETECTION

(71) Applicant: Microsoft Technology Licensing, LLC, Redmond, WA (US)

(72) Inventors: Crystal Lee Parker, Duvall, WA (US); Mark Louis Wilson O'Hanlon, Woodinville, WA (US); Andrew Lovitt, Redmond, WA (US); Jason Ryan Farmer, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 16/056,740

(22) Filed: Aug. 7, 2018

(65) Prior Publication Data

US 2018/0341330 A1    Nov. 29, 2018

Related U.S. Application Data

(63) Continuation of application No. 15/796,295, filed on Oct. 27, 2017, now Pat. No. 10,067,563, which is a continuation of application No. 13/474,723, filed on May 18, 2012, now Pat. No. 9,823,742.

(51) Int. Cl.
*G06F 3/01* (2006.01)
*G06F 3/16* (2006.01)
*G10L 15/22* (2006.01)
*G06F 3/0482* (2013.01)
*G06F 3/0484* (2013.01)

(52) U.S. Cl.
CPC ............ *G06F 3/013* (2013.01); *G06F 3/0482* (2013.01); *G06F 3/04842* (2013.01); *G06F 3/165* (2013.01); *G06F 3/167* (2013.01); *G10L 15/22* (2013.01); *G06F 2203/0381* (2013.01); *G10L 2015/228* (2013.01)

(58) Field of Classification Search
None
See application file for complete search history.

(56) References Cited

U.S. PATENT DOCUMENTS

| | | | | |
|---|---|---|---|---|
| 7,561,143 | B1* | 7/2009 | Milekic | G06F 3/013 345/156 |
| 10,048,748 | B2* | 8/2018 | Sridharan | G10L 15/22 |
| 2006/0192775 | A1* | 8/2006 | Nicholson | A61F 4/00 345/211 |
| 2010/0079508 | A1* | 4/2010 | Hodge | G06F 3/013 345/697 |
| 2010/0238280 | A1* | 9/2010 | Ishii | B60K 35/00 348/77 |

\* cited by examiner

*Primary Examiner* — Kenneth B Lee, Jr.
(74) *Attorney, Agent, or Firm* — Ray Quinney & Nebeker P.C.; John O. Carpenter

(57) ABSTRACT

A controller is adapted to recognize an input from a user using an input interface, determine if a user gaze information indicates that the user is gazing at a device, and when the user gaze information indicates that the user is gazing at the device, route response information to the device.

20 Claims, 6 Drawing Sheets

INTERACTION AND MANAGEMENT OF DEVICES USING GAZE DETECTION

CROSS-REFERENCE TO RELATED APPLICATIONS

This application is a continuation of U.S. patent application Ser. No. 15/796,295, filed Oct. 27, 2017, which is a continuation of U.S. patent application Ser. No. 13/474,723, filed May 18, 2012, now U.S. Pat. No. 9,823,742, the disclosures of which are hereby incorporated herein in their entireties.

BACKGROUND

Devices allow users to input information in a number of ways, such as with a keyboard, pointing devices, and dedicated hardware buttons. With respect to pointing devices, devices may receive user input from a mouse and/or a touchpad. If configured with a digitizer, inputs may also be made by sensing stylus proximity and touch (e.g., entered via a pen or a finger). Some devices, such as tablet-based personal computers, have the digitizer built into the display screen. Such devices may be operated with or without a keyboard. Speech commands, eye movement data, and gaze detection can be detected as inputs to devices using microphones and cameras without requiring the user to physically touch the device.

The user interface may provide a number of options or choices for the user may select. The displayed options or choices may be determined based upon the current context of the user interface, a device or user environment, prior selections, and the like. In current systems, the contexts and display options or choices all require active user input to the device, such as a button press, mouse movement or click, audible command, program interaction, and the like. For example, using manual inputs through a touch screens or voice inputs through a speech detector, the user may control a device or a user input. The user may apply voice or manual inputs to navigate into a submenu. Each submenu is typically dependent upon the user's prior input and may offer a reduced number of options or a set of choices that are based upon the user's last input.

Some devices allow users to enter commands using spoken words. In some cases, the same voice command may be used in a number of different contexts. However, the user has to manually indicate or select a context that the command is associated with before speaking.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, devices determine the appropriate context for a user interface or determine the available user inputs based on the user's gaze, which may include the line of sight and/or point of focus of the user. The available user inputs may include, for example, instruction sets, grammars, and recognition actions. The instruction sets may represent menu selections, display options, or groups of buttons offered via a user interface. The grammars may represent groups of words or speech inputs that the device will detect. The recognition actions may represent tactile inputs to a touch screen, haptic inputs to a device, or user gestures or motions that the device will recognize.

The device detects the user's gaze and, based upon the user's line of sight or point of focus, will choose the appropriate instruction set, grammar or recognition action. For example, if the user looks at buttons on a display and says "button settings," then the device will know to reduce the grammar, such as by selecting a subset of available command words, based upon the user's gaze and may also adjust the display context, such as the available buttons, based on the gaze. In another example, a graphical user interface (GUI) displays instruction sets to a user. When the user's gaze is detected on the GUI, the order of objects on the GUI, such as icons, symbols, menu items, text, or the like, may be reordered on the display based upon the object that is the focus of the user's gaze.

Context selection in voice, gesture, or touch-enabled applications or systems is improved using visual cues that are based on the user's point of focus or line of sight. In a look-to-talk embodiment, the context grammar enabled for voice control of a system is selected based on the user's gaze. In a look-to-touch embodiment, the touch-enabled actions that will be recognized by the system are based on the user's gaze. In a look-to-gesture embodiment, the gestures enabled for an application or system is based on the user's gaze. These and other embodiments provide look-to-interact systems that shorten the communication path to any desired result by combining visual cues with context-appropriate speech expressions, grammar, gestures, or touches to form a complete command structure.

In various embodiments, the user's gaze may be used, for example, to
  adjust the context of a speech, gesture, gaze, or touch recognizer, user interface, or other detection device;
  turn on or off a current recognition set or context library for the speech, gesture, or touch recognizer;
  segment recorded speech so that a devices capable of continuous speech recognition can properly identify speech segments to be treated as inputs or commands;
  stop or start a speech, gesture, or touch recognizer;
  determine a context;
  adjust the grammar in the speech, gesture, or touch recognizer;
  prevent a speech, gesture, or touch recognizer from recognizing speech, gesture, or touch;
  determine the applicability of actions or user inputs; and/or
  determine what a user is not looking at and using that to adjust speech, gesture, or touch and context.

The user's head, face, eye, and iris position as well as body posture and other cues, such as speech or gestures, may be used to determine the point of focus, line of sight, or gaze.

In other embodiments, multiple devices and systems may communicate gaze information to each other. This allows devices without gaze detection capability to obtain gaze information that can be used to select or modify a context or interaction set. The exchange of gaze information among multiple devices may also be used by the devices to determine which devices are not being looked at and, therefore, which devices should not respond to inputs. Additionally, context selection and interaction may occur on one device while the adjustment of a grammar, interaction set, or group of recognition actions occur on another device. Multiple devices can work in concert with each other to determine the gaze, context, and grammar applicable for one or more users.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

A device may make decisions about a user's intent to interact with it based upon the focus of the user. User gaze information influences the context and interaction sets for other speech, gesture, or touch recognition tasks. The interaction sets may be, for example, a grammar or dictionary used in a speech recognition system, a library of gestures or motions used in a gesture recognition system, or a set of actions or haptic inputs used in a touch recognition system. A gaze detector determines what the user is looking at (i.e. the user's point of focus) and/or the direction the user is looking (i.e. the user's line of sight). This gaze information is provided to a device that can interact with the user. Using the gaze information, which identifies what the user is looking at (or not looking at), the system may reduce the interaction set grammar available for the user. For example, the system may reduce the grammar used in a speech recognition system, which may increase the recognition probability for detected speech due adjustments in the possible recognition targets (e.g. sentences, phrases, words, etc.). Alternatively, the system may reduce touch inputs that will be recognized, which limits the user to only using allowed inputs. The system may further set a context for gestures, which would allow simple gestures to have multiple meanings depending on the context and the user's gaze. The order of screens, menus, or buttons on a display may also be arranged or rearranged based upon the point of focus of the user's gaze.

In other embodiments, brain waves may be detected from the user. The interaction sets include selected brain wave patterns that can be used as inputs to the system. In certain contexts, the brain wave interaction sets may be selected based upon the user's gaze.

The user's eye position, eye movement, and blink rate may also be detected. The interaction sets may include selected eye positions, eye movements, and blink rates that can used as inputs to the system. The gaze detector may initially be used to identify the user's gaze information, such as a point of focus, and then an eye-based interaction set may be selected based upon the gaze information.

Gaze detection is not limited to eye and iris position but may also include head and face position, body posture, and other visual cues that help to identify the user's point of focus or line of sight. Gaze detection may be accomplished, for example, by processing visual, infrared, or sonar images of the user. The images may be captured using, for example, depth cameras, digital or analog video cameras, infrared sensors, and/or ultrasound sensors. The position and orientation of the user's body, head, and eyes and the relative position of the user's irises may be extracted from the images and used to determine the user's point of focus or line of sight.

Figure 1:
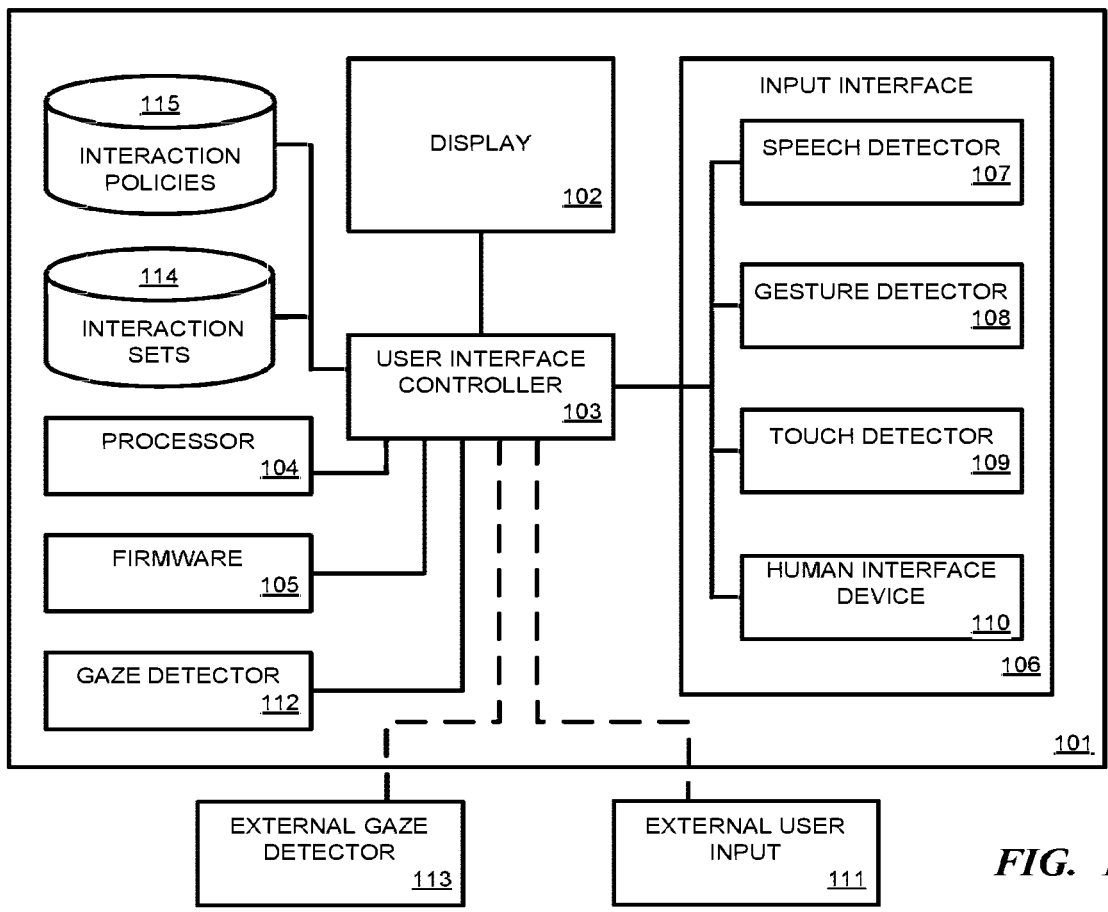
FIG. 1 is a high level block diagram of a system that uses gaze detection for management of user interaction.

FIG. 1 is a high level block diagram of a system 101 that uses gaze detection for management of user interaction. System 101 includes display 102 that provides information to the user. Display 102 may be a self-contained unit, such as a CRT, LED, or LCD monitor, or a projection display, such as a CRT, LCD or DLP projector. A user interface controller 103 provides content to display 102. The content may come from applications or software running on a processor 104 or firmware 105, for example.

Input interface 106 allows users to provide inputs to system 101. Inputs may be, for example, one or more of speech, gestures, touches, or other actions. A speech detector 107 may include a microphone that captures the user's sounds. These sounds are then compared to a dictionary or grammar of known words to identify the user's spoken inputs or commands. The spoken inputs or commands are provided to interface controller 103 for further processing. A gesture detector 108 may include cameras or other image detection device that captures a user's motions or gestures, such as arm, hand, head, leg, or body motions. These motions or gestures are compared to a library of known gestures and recognized gestures are provided to user interface controller 103. A touch detector 109 may be integral to display 102, which may be a touch screen, or may be a separate component, such as a drawing pad, tablet, or haptic controller. Touch detector 109 senses the user's physical actions, such as touching or swiping a touch screen with a hand or one or more fingers. Touch detector 109 may also sense shaking, twisting, or otherwise moving a haptic controller. These touch inputs may be compared to sets of known motions or actions. Recognized touch or action inputs are provided to user interface controller 103.

Other input devices, such as any human interface device (HID) 110, may be used with system 101 as appropriate. The HID 110 may be a keyboard, keypad, touchpad, trackball, pointing device, controller, or physiological sensor, such as a blood pressure, pulse, respiration, temperature, skin resistivity or other sensor. Additionally, system 101 may also receive user inputs from external sources 111. In some embodiments, system 101 does not have its own input interface 106 and must use an external user input 111.

System 101 also includes gaze detector 112 that monitors the user's body, head, eye, and/or iris position to determine the user's line of sight and/or point of focus. Gaze information, which may include either or both line of sight data (e.g. azimuth and elevation angles that indicate in which direction the user is looking) and point of focus data (e.g. an identity of a particular object or point in space on which the user is focused). The gaze information is provided to the user interface controller 103, which may use the gaze information to select a context for display 102 and/or a set of interaction functions to use with input interface 106. System 101 may also receive user inputs from external gaze detector 113. In some embodiments, system 101 does not have its own gaze detector 112 and must use an external gaze detector 113 or must receive gaze information from other devices.

System 101 may include a memory or other storage device for storing interaction sets 114 for use with input interface 106. Each input detector 107-110 may be capable of detecting many different inputs. For example, speech detector 107 may use a dictionary or grammar set of sounds that it recognizes as input words, gesture detector 108 may use a library of known gestures, and touch detector 109 may use sets of known motions or actions. Interaction sets 114 may include an entire dictionary, grammar, or library for each input as well as subsets of the whole set. The subsets may represent different combinations of selected inputs for each detector. For example, speech detector 107 may use an entire grammar set of all words that it is capable of recognizing or may use a subset of a few select words that are key for a particular situation. The entire grammar set may include hundreds of words, but the subset may comprise only a few words. For example, one subset may include just the words "on" and "off," and another subset may include just the words "start," "stop," "rewind," "fast forward," and "eject."

A memory or storage device stores interaction policies 115 that user interface controller 103 uses to determine which context or interaction set 114 to use at a given time or under certain conditions. The interaction policies may identify, for example, which input interface 106 and which interaction set 114 to use when different types of gaze information are detected.

In an example embodiment that is not intended to limit the scope of the invention, system 101 may be used in a vehicle. Display 102 may be part of the instrument cluster or a heads up display (HUD). Gaze detector 112 may be one or more cameras positioned to capture images of the driver and/or passengers in the vehicle. Gaze detector 112 determines that the driver has focused on display 102 or an area of display 102. User interface controller 103 may change display 102 to present a context selected for the area of the display that the driver has focused on. User interface controller 103 may further select an interaction set 114 corresponding to the area the driver has focused on so that any command spoken by the driver are optimized for that area.

By identifying the area of the display that the driver is focused on, the system can respond with a result that the user expects, such as a new display with additional objects that are related to the area of the driver's focus. For example, processor 104 may be running a navigation application that presents navigation information, such as a map, on display 102. Gaze detector 112 analyzes the drivers head and eye position. When gaze detector 112 determines that the driver is looking at the map display 102, it sends gaze information to user interface controller 103 to identify the map as the driver's point of focus. User interface controller 103 then selects appropriate interaction sets 114 for the map display or for a navigation context. If the driver then says "find home," the speech detector 107 recognizes the command and provides it to the navigation application via user interface controller 103. The navigation application then calculates a route to the driver's home location and displays the route on display 102. If the driver is instead looking through the HUD at the buildings and the user says "find home," the HUD may blink, display a cursor, or indicate in some other way which house on the street is their "home."

In current vehicle navigation systems that accept voice commands but that do not have gaze information, a crude set of commands and responses have to be negotiated to achieve the same result. Additionally, the driver typically has to press a voice-command button before speaking or has to first speak a key-word to signal to the system that a voice command is coming. For example, when the driver pushes a voice-command button, the system may state "say a command." The driver says "navigate," and the system acknowledges by stating "navigating." The driver then says, "find location," and the system states "finding location," to acknowledge the command. These prompt/command/acknowledgement sequences continue as the driver provides an address, requests a route, and selects the preferred route.

Using gaze information, system 101 may assume that the driver is interested in navigation and will limit itself to a set of navigation commands once the system determines that the driver is looking at the map. By selecting an appropriate interaction set, the system will improve the probability of identifying the desired command. For example, because the system knows that the driver is looking at the map, it will select the navigation interaction set. When the speech detector identifies the spoken command "find home," the system will look for an address because it is has been limited to navigation inputs. As a result, the system will not have to determine if the "find home" command is associated with other vehicle systems, such as telephone system. Therefore, instead of incorrectly attempting to find a home telephone number or issuing additional prompts to clarify the command, the system may limit the "find home" command to the navigation scenario. The system may be set to the selected context or grammar either temporarily or permanently. In this example, the navigation context and/or grammar may be set as long as the driver's gaze information has been focused on the map display, for a preselected duration after the driver's gaze has moved off the map, or until another context or grammar is selected.

It will be understood that system 101 may interact with two or more users. Gaze detector 112 may be capable of identifying multiple users and their respective lines of sight or points of focus. Alternatively, gaze detector 112 may be pointed at one user, such as a driver, and an additional or external gaze detector 113 may be pointed at another user, such as a passenger in the vehicle. The two users may interact with the system at the same time. Each user has a unique point of focus or line of sight that the system can recognize. The system may select an appropriate interaction set for each user based upon their respective gaze information, such as an object that each user is watching. The system then listens to each user's commands and performs the appropriate responses for that user's point of focus or line of sight. For example, if the driver looks at a telephone screen and says "call home," then a call is initiated to the driver's home telephone number. If the passenger looks at a map display and says "find food near me," then the system will display restaurants on the map near the current location.

Recognition of multiple users and identification of their independent gaze information allows the system to serve multiple users simultaneously. Additionally, this multiple-user capability allows the system to determine which user is speaking and/or is not speaking to the system. For example, if neither user is looking at the map display and one of the users says "find home," then the system may not respond to these words as a navigation command. Interaction policies 115 can be used to establish rules identifying when certain potential inputs will be treated as commands. A navigation policy may require a user to look at a map display in order to initiate certain commands, for example. The interaction policies and interaction sets may be different for different users. For example, a passenger may be allowed a more detailed navigation interaction set than the driver in order to limit driver distractions inside the vehicle.

In another example embodiment, a user may be an information worker and system 101 may be used to display documents. The user focuses on a displayed document and uses a waving gesture to move from page to page. A gesture detector 108 identifies the waving motion as a potential input. Because gaze detector 112 has identified the user's point of focus as the displayed document, the system will change pages in response to the waving motion.

The user may also have a telephone that also incorporates gesture-based inputs. The telephone may interpret waving motions as a signal to send inbound calls to voicemail, for example. When the user receives a call, the telephone will ring and the user's attention turns to the telephone. Gaze detector 112 identifies a new point of focus that is not the displayed document. If the user now makes the same waving motion, the system will not change pages on the document. Instead, the telephone which may or may not have a gaze detector will recognize the gesture and will send the call to voicemail. The user then returns his or her attention to the display 102 and may continue to page through the document using the waving motion. This gesture information may be sent to the phone from the document displaying device or from an additional third device which detects gestures.

The user may also interact with the devices using voice commands. The device that is displaying a document being read by the user may understand the word "voicemail" as a command to open a voicemail application and to play voicemails through the device. The user's telephone recognizes the word "voicemail" as a command to send an incoming call to voicemail when the user looks at the telephone. When a call comes in, the user's gaze shifts from the document to the telephone and the user says "voicemail." Because the user is not looking at the document, the voicemail application does not open. Instead, the telephone sends the call to voicemail. The document device may send the gaze information to the telephone to indicate that the user is looking at the telephone and, therefore, the user's speech should be recognized by the telephone. Later, when the user says "voicemail" to the document device, the document device informs the telephone, which does not have a gaze detector, that the voice commands are currently directed to the document device and, therefore, the telephone does not act on the speech command. In a further embodiment, the telephone does not have a speech recognizer. When the document viewer determines that the telephone is the point of focus and the user says "voicemail," the document device will inform the telephone of this interaction and the telephone will take the appropriate action.

The interaction set or context may be selected based upon the duration of the user's gaze. If the user's gaze passes over an object, area, or display, the system may not react to a fleeting glance. However, if the user's gaze stays on one object, area, or display for longer than a predetermined duration, then the system will adjust the context based upon the gaze information. This prevents unnecessary changes to displays and interaction sets.

The duration of the user's gaze may trigger additional responses. For example, a brief look at a display may result in a first context being selected, but a longer look at the display may result in a second context being selected. This second context may be a subset, superset, independent set, or any combination of other contexts, but is not required to have overlapping features from the first context. On the other hand, if the user looks at a display for too long with or without providing additional inputs, the system may provide feedback to alert the user that he or she has spent too long looking at the display. This may be used in a vehicle, for example, which provides an audible alert or steering wheel vibration if the user looks at a navigation screen for too long while the vehicle is moving. Similarly, the system may provide feedback to the user if it determines that the user's gaze is not focused on the road for a certain frequency or if the user has fixated on any object for longer than a predetermined duration.

In various embodiments, the duration of the user's gaze in a particular direction or on a particular object (or not in the particular direction or not on a particular object) may set or reset the context and interaction set. For example, the user may look at a display for a predetermined duration to trigger a particular context/interaction set. When the user looks away, the selected context/interaction set may remain until reset or for a limited interval. The context/interaction set selection may be based on gaze duration, but may be set after the user looks away.

Figure 2A:
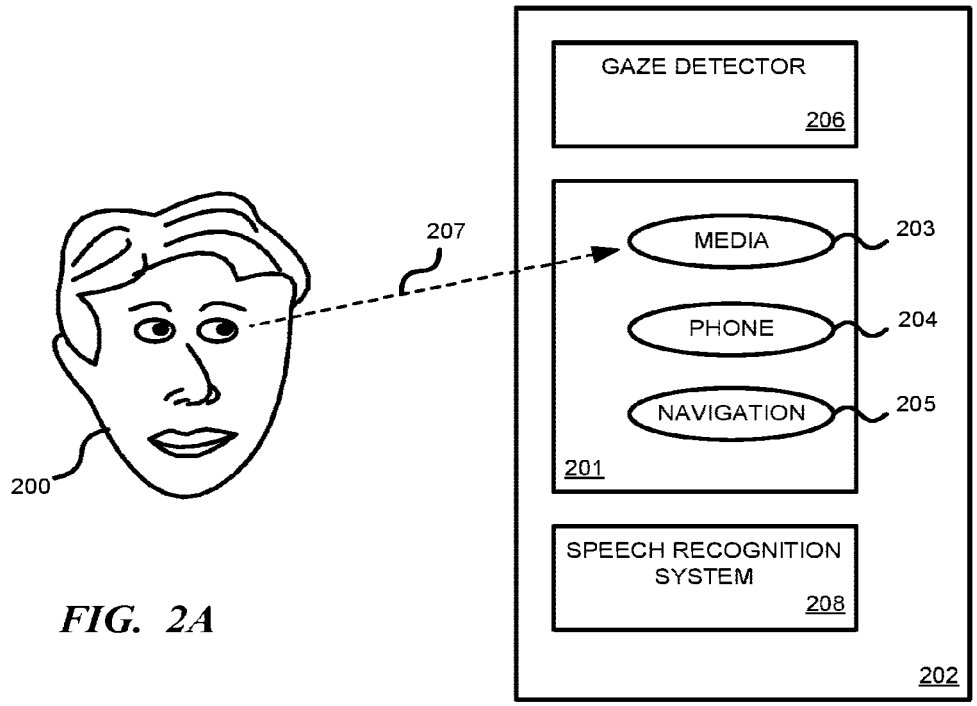
FIGS. 2A and 2B illustrate changes to a display when a user look at different areas of a display.
Figure 2B:
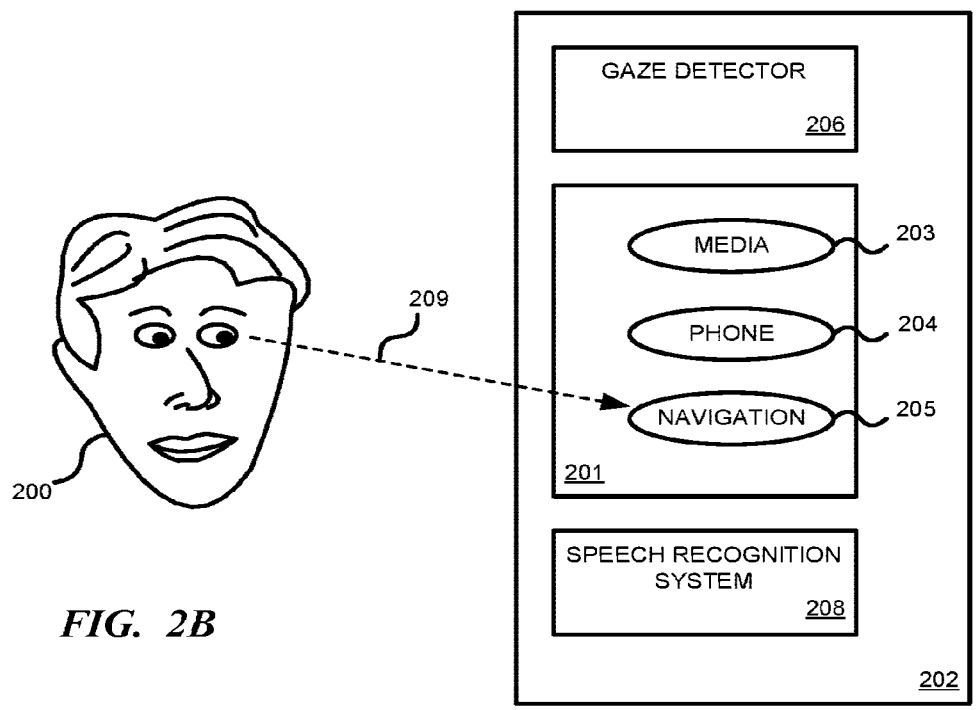

FIGS. 2A and 2B illustrate a user 200 who is looking at display 201 on system 202 which is presenting several options including media 203, phone 204, and navigation 205. These options may be presented as button, tiles, or simply words on display 201. Gaze detector 206 monitors user 200 and identifies the user's point of focus. As illustrated in FIG. 2A, the user's gaze 207 is focused on media option 203. Accordingly, system 202 knows that the user is currently interested in the media subsystem and not the phone or navigation subsystems. System 202 selects a media interaction set, which may be a grammar for use with speech recognition system 208 that includes media control terms, such as the words "start," "stop," "rewind," "fast forward," and lists of artist and song names and terms. When user 200 says "Chicago," the media system lists songs from the musical Chicago.

FIG. 2B illustrates a change in user 200's gaze from media option 203 to navigation option 205. Gaze detector 206 identifies this change in gaze 209 to identify the navigation option 205 as the user's point of focus. System 202 then changes the grammar to be used by the speech recognition system 208 to a navigation set that includes street, city, and other geographic terms. Now, when user 200 looks at navigation option 203 and says "Chicago," the system looks for the city of Chicago or nearby streets named Chicago.

In some embodiments, before reacting to a potential input, the system may prompt the user for further clarification or confirmation of the command. For example, instead, of immediately shifting a navigation display from a currently displayed route when the user says "Chicago," the system may respond with a prompt that asks the user to confirm that he or she wants to change the display. The system's grammar selection does not always implicitly or explicitly imply or require an immediate action by the system without verification.

Figure 3:
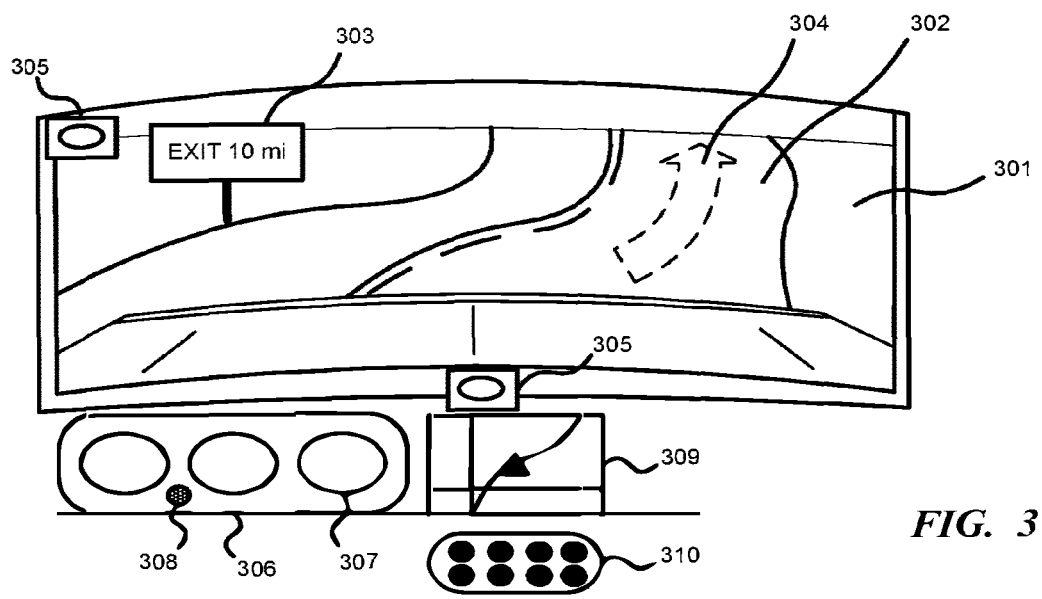
FIG. 3 illustrates an automotive infotainment system employing gaze detection according to one embodiment.

FIG. 3 illustrates an automotive infotainment system employing gaze detection according to one embodiment. As used herein, the term infotainment system refers to a system that provides information, such as navigation and telematics data, and entertainment, such as music, video, radio and other media. The driver looks out windshield 301 to see road 302, information signs 303, and heads up display (HUD) information 304. The HUD information 304 may be projected on windshield 301 by the navigation system and may include, for example, route data, speed data, entertainment data, or any other information that may be helpful to the driver. Gaze detection cameras 305 are used to determine the driver's gaze information. Instrument panel 306 includes a number of displays or dials 307 for displaying vehicle information. A microphone 308 may be used by a speech detection system to capture spoken commands from the driver. An infotainment screen 308 may be used to display navigation data (e.g. a map or route information), entertainment data (e.g. movie video or media information), or other data (e.g. a video call or an Internet browser). Interface 310 provides a number of soft buttons, tiles, icons or text for the driver to select various options for the infotainment system.

In one embodiment, speech recognition is activated only when the driver's gaze is detected on certain components, such as instrument panel 306, infotainment screen 309, or soft button screen 310. For instance, when the driver looks straight ahead out windshield 301 and attempts to control the system using speech commands, the system will not be in a recognition mode and, therefore, will not accept the spoken commands. This allows the driver and passengers to speak freely without accidently triggering any system functions. However, when the driver's gaze is detected on certain internal components, then the system will react to the driver's spoken commands. For example, if the user then looks at infotainment screen 309, then the system will select an interaction set associated with the infotainment components. If the driver says "show me navigation directions," then the display will change to a map, route data or directions.

In another embodiment, the user's gaze may be detected as focused on a highway sign 303. The system may then select an appropriate navigation interaction set that is optimized to provide information associated with the highway sign 303. The interaction set may support commands that would help the driver determine whether to exit the highway, such as commands to provide a fuel level, miles to go before refueling is required, or distance to destination. The system may also change the context of infotainment screen 309 or soft button screen 310. Upon detecting the driver's gaze on highway sign 303, infotainment screen 309 may display a route to the destination shown on the sign 303 or may list businesses and services offered at an upcoming exit.

Soft buttons 310 may be selected to correspond to the highway sign 303. By optimizing the options available via soft buttons 310 based upon the driver's gaze, the system can minimize the amount of time that the driver has to look inside the vehicle and away from the road. For example, when the driver focuses on the instrument panel 306, the soft buttons 301 may provide options to adjust the instrument panel lighting, change the information shown on displays 307, or run engine checks.

In other embodiments, the vehicle manufacturer or infotainment OEM may have the ability to override the context or interaction set selection. For example, under certain conditions, the manufacturer may decide to limit driver use of the infotainment system for safety or other reasons.

The driver's physiological state or health conditions, such as pulse rate, blood pressure, and skin conductivity, may be monitored. If the user's gaze is detected as focused on another driver or vehicle, then a possible mad, stressed, or road-rage driver is identified. A physiological interaction set may be selected, and the driver's blood pressure is measured. If the driver's blood pressure is above a preset limit, then the system changes context to relax the driver, such as playing soothing music, to avoid road rage incidents. In another embodiment, if the driver looks at a specific point, then the context for the physiological measurement is selected.

Figure 4A:
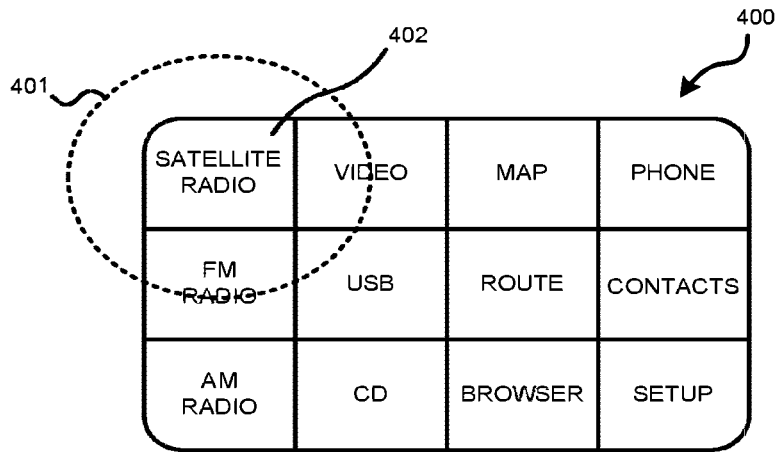
FIGS. 4A-4C illustrate changes to a soft-button panel based upon a user's gaze according to one embodiment.

The soft button display may change based upon the driver's point of focus on the display itself. FIG. 4A illustrates an example set of soft-button panel 400 according to one embodiment. Circle 401 represents the driver's point of focus as determined by a gaze detector when the driver looks at the soft-button panel. Circle 401 could be displayed on panel 400 in some embodiments to provide feedback to the driver. However, in the example of FIG. 4A, circle 401 is used merely to illustrate the driver's point of focus. The gaze detector determines that the driver is focusing on soft button or tile 402 for "satellite radio." This system may react to this information in several ways. In one embodiment, the system may simply turn the satellite radio in the vehicle on or off.

In another embodiment, the system may select an interaction set that is associated with satellite radio. The interaction set may be a grammar that supports satellite radio voice commands. The grammar may be optimized to identify spoken words that relate to volume setting and channel selection or searching (e.g. "louder," "quieter," "channel up," "channel down," or "find ___"). The interaction set may also be a gesture library of driver motions that can be used to control the satellite radio, such as hand, arm or head motions that cause the satellite radio volume or channel to change.

Figure 4B:
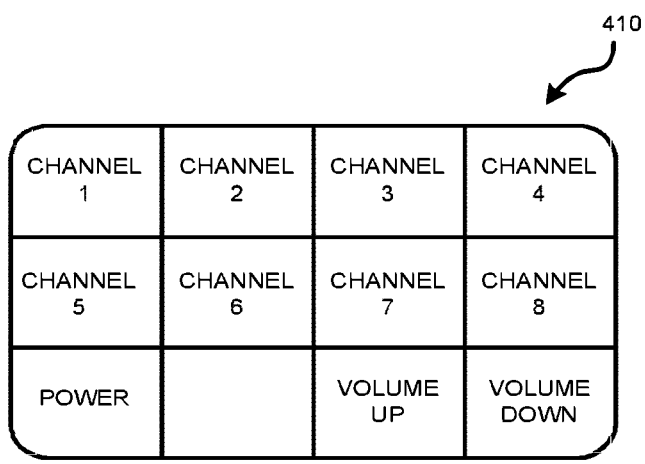

Instead of (or in addition to) selecting an interaction set in response to the driver's gaze on soft-button panel 400, the display itself may change. When the system identifies the driver's gaze area or point of focus 401 on satellite radio tile 401, the display may change as illustrated in FIG. 4B. Soft-button panel 410 includes options that are specifically associated with satellite radio option 401. The driver may select a preset channel 1-8, adjust the radio volume, or turn the radio on/off by touching the appropriate button on panel 410. This would allow the driver to make a radio selection with only one button press. In prior systems, the driver must make multiple button presses to get to the same menu 410. Additional layers of soft-button panels may be presented after panel 410 if the driver continues to look at the display but does not press a button. The next panel may be, for example, a list of additional preset channels 9-16 or a search menu that allows the driver to speak the name or number of a channel.

Figure 4C:
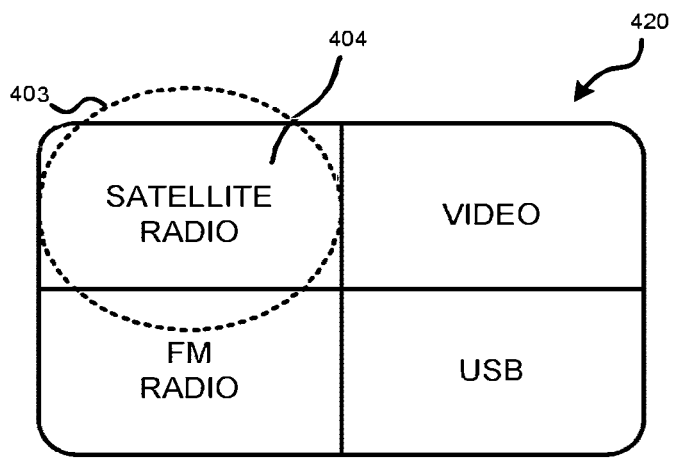

In some situations, the system may not be able to identify a particular button, such as button 402, that is the driver's point of focus. In such a case, the system may create a new display that expands the buttons within the driver's gaze or line of sight. For example, in FIG. 4A, the satellite radio, video, FM radio, and USB buttons may all be within a margin of error of the driver's gaze 401. FIG. 4C illustrates an alternate soft-button panel 420 on which the four buttons under gaze area 401 are expanded. The driver looks at the new display 420 and the system determines a new gaze area or point of focus 403. Because of the increased button size, it is more apparent in FIG. 4C that the driver is looking at satellite-radio button 404. The system may then select an interaction set of satellite radio or present satellite-radio options as illustrated in FIG. 4B.

Figure 5:
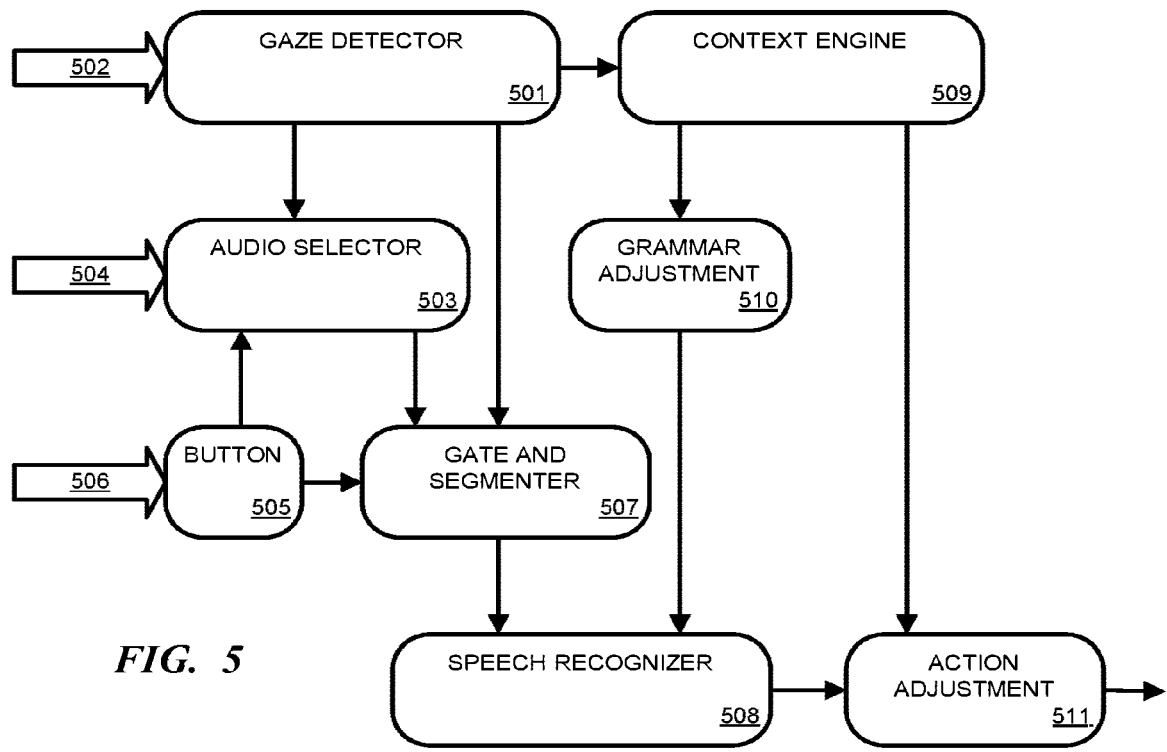
FIG. 5 is a block diagram illustrating components of a system according to an example embodiment.

FIG. 5 is a block diagram illustrating components of a system according to an example embodiment. Gaze detector 501 receives user gaze information 502, which may be user image data that gaze detector 501 processes and/or line of sight data (e.g. azimuth and elevation angles that indicate in which direction the user is looking) and/or point of focus data (e.g. an identity of a particular object or point in space on which the user is focused).

Audio selector 503 receives audio information 504, such as the user's spoken commands. Audio selector 503 ensures that the best audio signal is presented to the system. For instance, a beam former and microphone array, a multitude of individual microphones, or a single microphone may be used to capture and select user audio. Audio selector 503 may also include digital signal processing components that clean and shape the input audio 504. Processing by audio selector 503 may be based on signals from gaze detector 501, such as signals indicating whether the user is facing a microphone or indicating which of several users are speaking.

Button component 506 is a physical or soft button that can be pressed or selected 506 to override the gaze information. In one embodiment, button 506 is a push-to-talk (PTT) button. Button 505 can influence both the selection and gating of information for the speech recognizer.

Gate and segmenter component 507 controls speech recognizer 508 by turning it on and off (gating). Gate and segmenter component 507 also segments the audio signals and pairs audio segments to changes in gaze information. For example, the user may speak one series of commands while looking at a first object and then speak other commands when looking at a second object. Gate and segmenter component 507 links each set of commands with the appropriate object. These audio segments are sent to speech recognizer 508 for recognition.

The gaze detection information is provided to context engine 509, which may influence speech recognition. Context engine 509 understands how the gaze information relates to certain components, objects, or sections of a display and can apply changes in the user's gaze to the operation of the speech recognizer 508.

Grammar adjustment 510 modifies the grammar used by speech recognizer 508 to improve the recognition of commands that are relevant to the user's current gaze, such as by selecting an appropriate interaction set for the gaze information. Alternatively, grammar adjustment 510 may add special recognition targets that are unique to the context.

Action adjustment 511 uses the context information and the recognition output to perform the specific action requested by the user. For example, the term "home" may mean different things in different contexts. Under the influence of the gaze information, the action adjustment 511 maps recognized speech outputs to the correct actions.

Although FIG. 5 illustrates using audio inputs and a speech recognizer for receiving user commands, it will be understood that in other embodiments any input may be used in addition to or in place of the audio processing. For example, instead of audio selector 503, a touch selector may capture inputs from finger touches and/or swipes on a touch screen or a camera may capture motions or gestures. Instead of speech recognizer 508, a touch or gesture recognizer may be used to interpret the commands indicated by touches or gestures.

Figure 6:
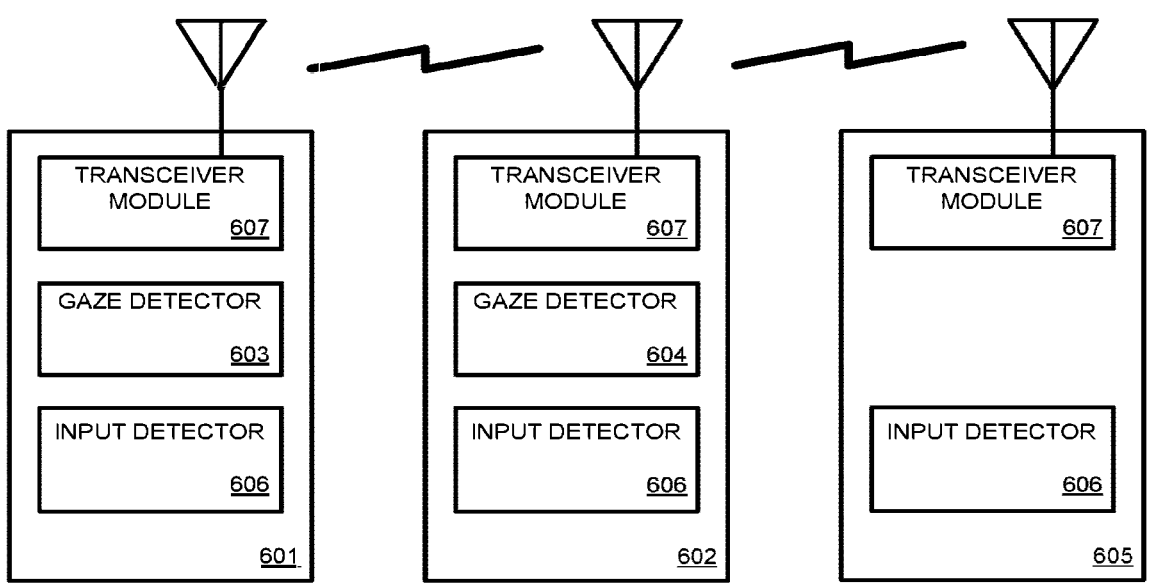
FIG. 6 is a block diagram illustrating multiple devices sharing gaze information.

FIG. 6 is a block diagram illustrating multiple devices sharing gaze information. Devices 601 and 602 both include gaze detectors 603 and 604, respectively. Device 605 does not have its own gaze detector. Each device 601, 602, 605 has one or more input detectors 606. The input detectors on each device may be adapted for the same type of input, such as speech, gestures or motions, or each device may have a different type of input detector. The devices 601, 602, 605 also have a transceiver module 607 that allows the devices to communicate with each other wirelessly using any appropriate communication technology, protocol, or standard, such as Bluetooth, WiFi, infrared, or cellular radio technology.

Transceivers 607 allow the devices to exchange gaze information and input information among other data. The devices may cooperatively use the gaze and/or input information. For example, device 601 may be a smartphone, device 602 may be a tablet computer, and device 605 may be an electronic book. Each device may belong to the same user. Smartphone 601 and tablet computer 602 both have cameras and, therefore, can process images of the user to generate gaze information. These devices, 601 and 602, can use their own gaze information to select the appropriate interaction set for input detectors 606.

Additionally, devices 601 and 602 can exchange gaze information to assist the devices in generating or clarifying gaze information. For example, if the user is looking at device 601, then gaze detector 603 should identify device 601 as a point of focus. Gaze detector 604 should determine that device 602 is not the point of focus. Device 601 may send a signal that indicates that it is the point of focus (i.e. "looking at me") or that contains specific gaze information, such as a point of focus, location, or direction the user is looking. Device 602 may send a signal indicating that it is not the point of focus (i.e. "not looking at me") and may include specific gaze information. When device 601 also detects an input, such as a spoken command, gesture, or other action, it will react to the input because it knows that it is the point of focus (and has confirmation from device 602 that it is not the point of focus). Similarly, device 602 may detect the input for device 601 and should not respond to the input because it has determined that it is not the point of focus (and has confirmation from device 601 that it is the point of focus).

Device 605, which does not have its own gaze detection capability, may rely upon gaze information from devices 601 and 602 to determine whether it should respond to detected inputs. For example, the devices may be linked and may be aware of each other. When device 605 receives signals from devices 601 and 602 that they are not the point of focus, then device 605 may assume that it is the point of focus and may respond to any detected inputs. Alternatively, devices 601 and/or 602 may send specific gaze information, such as a point of focus, location, or direction the user is looking, to device 605. This specific gaze information may allow device 605 to determine that it is in fact the point of the user's focus. For example, the specific gaze information may be related to a common reference point, GPS coordinates, or other data that allows device to match the point of focus to its own location.

Figure 7:
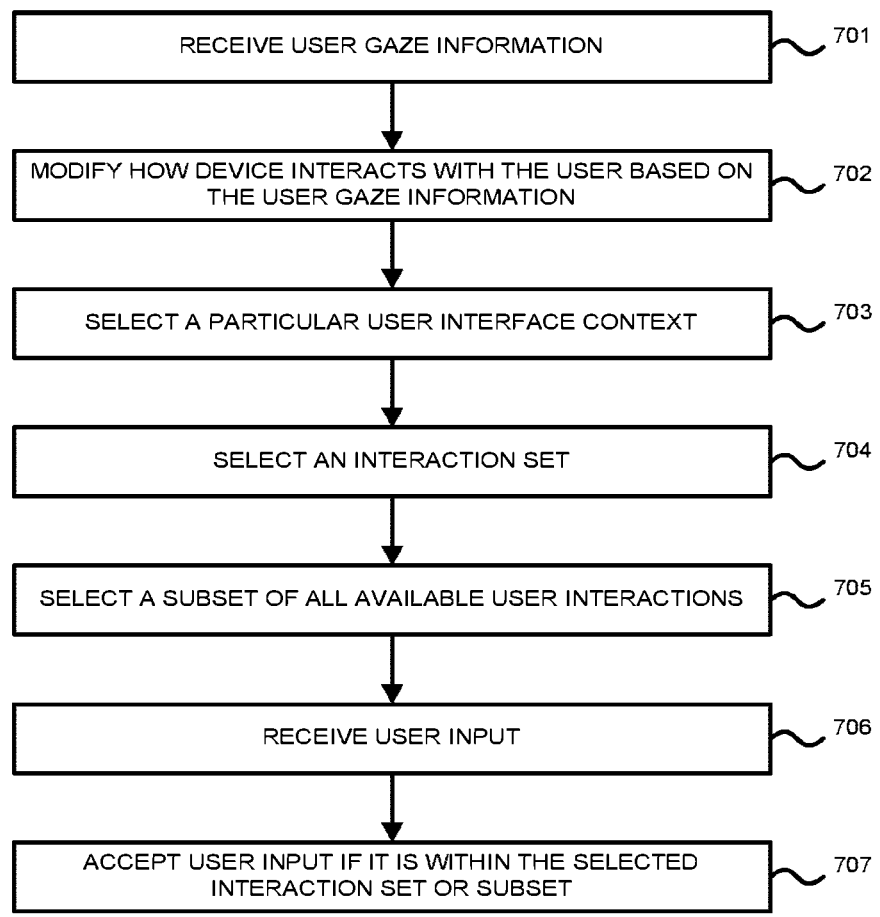
FIG. 7 is a flowchart illustrating a method or process for using gaze information according to one embodiment.

FIG. 7 is a flowchart illustrating a method or process for using gaze information according to one embodiment. In step 701, user gaze information is received by a device. The user gaze information may be a direction that a user is looking or a user's point of focus or both. The user gaze information may identify an area that is not being covered by the user's gaze. The user gaze information may be provided by internal or external devices or cameras. Additionally, the user's gaze information may include a duration indicating how long the user's gaze was focused on a point of interest or in a direction.

In step 702, the manner in which the device interacts with the user is modified based upon the user gaze information. Modifying how the device interacts with the user may include selecting a particular user interface context in step 703 and/or selecting an interaction set in step 704. The user interface context may comprise, for example, as a user interface menu or an arrangement of user interface components. The interaction set may comprise, for example, a grammar set used to interpret user speech inputs, a gesture set used to interpret user gestures, a user physiological set that is used to monitor health factors of the user.

In step 705, a subset of all available user interactions may be selected as possible inputs to the device. For example, a grammar set may be narrowed to a subset of words that are associated with commands for a particular feature of the device. In another embodiment, the subset of user interactions may include rearrangement of items on a display, such as adding items, deleting items, and/or zooming in or out on the display.

In step 706, the user's input, such as speech, gestures, or other actions, are received by the device. In step 707, if the user's input falls within the selected interaction set or subset, then the input is accepted by the device. For example, if the user's speech corresponds to words in the selected grammar set, then the device will accept that speech as an input or command.

Figure 8:
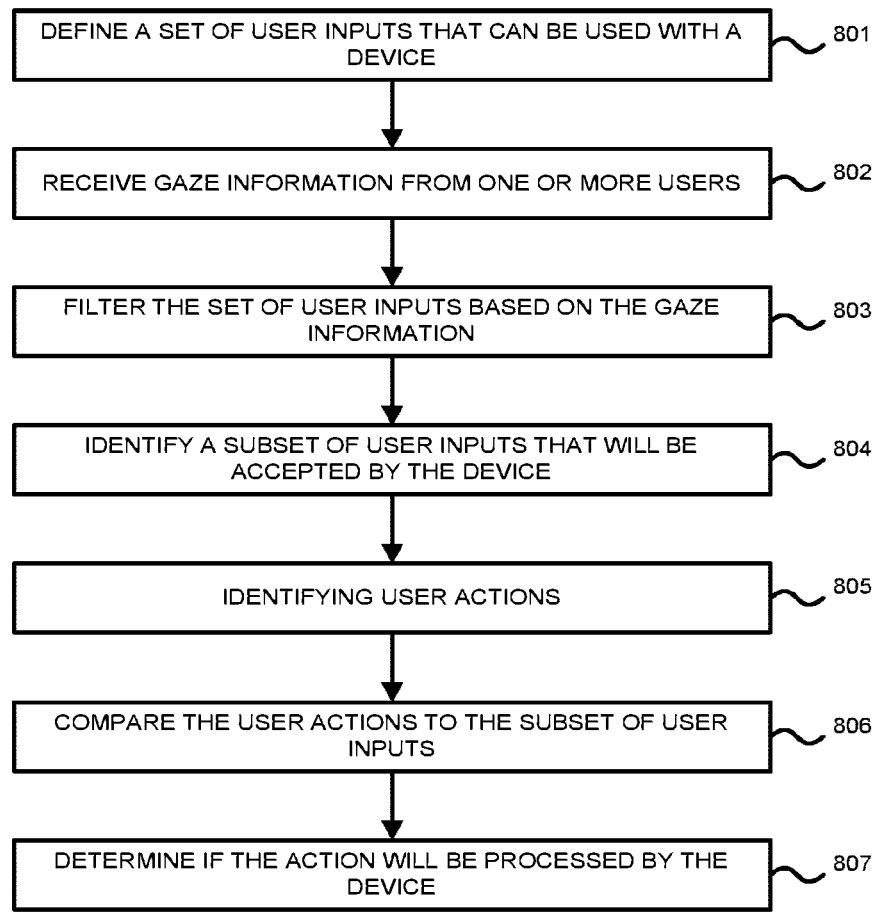
FIG. 8 is a flowchart illustrating a method or process for using gaze information according to another embodiment.

FIG. 8 is a flowchart illustrating a method or process for using gaze information according to another embodiment. In step 801, define a set of user inputs that can be used to interact with a device. The set of user inputs may include, for example, one or more of speech inputs, gesture inputs, action inputs, human interface device inputs, or user physiology inputs. In step 802, gaze information from one or more users is received by the device. In step 803, the set of user inputs are filtered based on gaze information from the one or more users. In step 804, a subset of user inputs that will be accepted by the device are identified from the filtered user input set.

In step 805, user actions are identified. The user actions may include, for example, speech, gestures, or other actions or inputs to a keyboard, pointing device, touch pad, or other input device. In step 806, the user actions are compared to the subset of user actions. In step 807, the device determines whether the action will be processed.

User gaze information may be used to identify a subset of user gestures that will be accepted by the system. User gestures will then be analyzed to determine if the motion matches a gesture within the subset. In one embodiment, the user may be limited to interact with the device using only the subset of user inputs and no other inputs for a predetermined period.

It will be understood that steps 701-707 of the process illustrated in FIG. 7 and steps 801-807 of the process illustrated in FIG. 8 may be executed simultaneously and/or sequentially. It will be further understood that each step may be performed in any order and may be performed once or repetitiously.

Some embodiments are directed to methods, systems, and computer program products for adjusting user interface elements and/or altering a user interface. In some embodiments, user gaze information is accessed. User interface elements of interest are identified based on this gaze information. One or more of the user interface elements are adjusted to optimize user interaction with the user interface based on the gaze information. The one or more identified user elements are adjusted within the user interface. Accordingly, presentation of the one or more identified user interface elements is changed on the display device. The user interface screen depicts user interface adjustments changing the size, spacing, and color of the elements as described in pending U.S. patent application Ser. No. 13/316,101, entitled "Adjusting User Interface Elements," filed Dec. 9, 2011, the disclosure of which is hereby incorporated by reference herein in its entirety.

Additional embodiments are directed to methods, systems, and computer program products for adjusting user interface screen order and composition. One or more user interface elements of interest are identified from within a screen flow based on user gaze information. Adjustments to the flow on one or more screens are formulated to facilitate more appropriate access to specified user interface elements within the screen flow in view of the gaze information. The screen flow is adjusted in accordance with the formulated adjustments for more appropriate access to certain user interface elements. In some embodiments, either alternately or in combination, contextual information is used when formulating screen flow adjustments. Contextual information may represent an operating context for an application. Based on the operating context and the user gaze information, one or more user interface elements of interest that are to be adjusted are identified from within a screen flow as described in pending U.S. patent application Ser. No. 13/316,211, entitled "Adjusting User Interface Screen Order and Composition," filed Dec. 9, 2011, the disclosure of which is hereby incorporated by reference herein in its entirety.

The following non-limiting examples illustrate different embodiments of systems that may incorporate gaze detection technology.

In a first non-limiting example, the user interacts with a system that has a screen and a number of software buttons. The system implements gaze detection so that it can determine if the user is interacting with the buttons or the screen. When the user gazes at the buttons and speaks a button setting, the system knows that the user is looking at the buttons based on the gaze information. The system then uses the context of the buttons to recognize to spoken setting. If the system did not use the gaze information, the user would have to manually navigate, for example, from ROOT→Controls→Settings→Buttons.

In a second non-limiting example, a user may be using a machine that has three displays—left, right, and center. The left display shows a technical manual for the machine, the center display shows machine controls, and the right display shows a machine status. In this embodiment, the speech recognizer may be running continuously. During operation, the user looks left and says "open flow," then looks my to the center and says "open flow," and finally looks right and says "open flow." The speech recognizer uses the head position to segment the users running speech. Thus, the system uses the left display context to open a flow chapter in the manual, uses the center display context to open controls for the flow of electricity to the machine, and uses the third display context to open statistics related to the history of the flow to the tool.

In a third non-limiting example, a shopper is in a noisy mall environment. A digital sign or information kiosk is located in the middle of the mall and is adapted to respond to spoken commands or queries. Shoppers are monitored as they walk by the sign or kiosk and their gaze is tracked. In this case, the system only responds to commands or queries that are given when a shopper is looking directly at the sign or kiosk.

In a variation of the third non-limiting example, the sign or kiosk may have an explicit method for informing the shopper how to interact. For example, there may be a sticker or notice on the sign stating that the shopper must look at a specific spot on the sign to interact with the device. In this case, the sign would exclude all users who are not looking at the notification. This would prevent people who are looking at or in the direction of the sign, but talking to a fellow shopper, from changing the state of the sign.

In another variation of the third non-limiting example, the sign is a map of the mall, and the shopper is looking at the map. The user looks at a first store on the map and says "center." The system knows where the shopper is looking by tracking his or her gaze and, in response to the "center" command, centers the map on the first store the shopper is looking at. The shopper then looks at a second store on the map and says "information." The system then displays information for the second store that the user was looking at without re-centering the map.

In a fourth non-limiting example, a computer controls all or most electronics within a room. The user designates that interaction with the computer will happen through a designated object, such as a bowl. The computer has a gaze detector that determines if a user is focused on the bowl. If a user is looking at the bowl and says something, then a speech recognizer processes the speech to understand the recited command. For example, the user may look at the bowl and say "lights on" to turn on the room lights. If the user is not looking at the bowl (or other designated object), then the user cannot command the computer or electronic devices in the room.

In a fifth non-limiting example, an infotainment system in a car will interact with a user only if the user is looking at the infotainment display or if the driver has pressed a PTT button. If the driver presses the PTT button, then the system will listen only to the driver. In other cases, the person looking at the infotainment display (e.g. the driver or a passenger) has the ability to command the system using speech. For example, if the passenger and driver are talking about possible destinations, the system will not attempt to navigate using the driver or passenger's speech unless one of them is gazing at the display or if the driver speaks after pushing the PTT button.

In a sixth non-limiting example, a digital sign is located in the middle of a mall. The sign determines that a shopper is not looking at it, but detects the shopper say "show me a map." Knowing that the shopper is not looking at it, the sign identifies an alternative way to show a map to the shopper. The sign may push a notification with a link to the map or send the map itself to the shopper's phone.

In a seventh non-limiting example, gaze detection systems are mounted throughout a plant. The gaze detectors notice that the gaze of a worker is focused on a shelf of parts. The worker has a ruggedized tablet and presses a button labeled "inventory" on the tablet. The tablet then runs an inventory application for the parts on the shelf where the worker is looking.

In an eight non-limiting example, a consumer carries a touch device with a video camera on the back (pointing away from the consumer) and a gaze detection system on the front (facing the consumer). The consumer points the video camera at a scene, and the scene is displayed on the device. The gaze detection system determines where the consumer's point of focus is on the display, correlates that point of focus to the scene, and provides context-specific information about the object the consumer is looking at.

In a ninth non-limiting example, a driver looks at a highway exit sign. The system has an active navigation route and determines the driver is looking at a sign that is not part of the route. The system offers the driver the distance to the next turn and, if a HUD is available, projects a red X over the sign so the driver does not exit the highway.

In a tenth non-limiting example, a system may run multiple operating systems. The system determines which user is looking at the screen and displays that user's operating system and associated interface. The system may also select different interaction sets or grammars for each user and/or allow different ranges of control for each user.

In an eleventh non-limiting example, a street camera performs gaze detection and sends the gaze information to passing cars. Using this gaze information, the car then implements the selection of an appropriate context or interaction set selection. The gaze detection may come from any outside source.

In a twelfth non-limiting example, an external source, such as a cloud service, provides context for a device. Interaction sets, such as grammars, are stored on the device and are selected based upon the context provided by an outside source. Gaze information may be used to further select the context and/or interaction set. The gaze information may be exchanged with the cloud service to identify the context.

In a further non-limiting example, the word "open" may correspond to a number of different commands in a vehicle system. Depending upon the user's point of focus or direction of gaze, the word "open" may cause the system to unlock the vehicle doors, open a power door or hatchback, open a garage door, open a music folder, or open a CD drawer.

Referring again to FIG. 1 and other embodiments disclosed herein, system 101 is only one example of a suitable environment for implementing gaze detection and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

An exemplary system for implementing various aspects of the invention may include a general purpose computing device in the form of a computer. Components may include, but are not limited to, various hardware components, such as a processing unit, data storage, such as a system memory, and a system bus that couples various system components including the data storage to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in ROM. RAM typically contains data and/or program modules that are immediately accessible to and/or presently being operated on by a processing unit. By way of example, and not limitation, data storage holds an operating system, application programs, and other program modules and program data.

Data storage may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media provide storage of computer-readable instructions, data structures, program modules and other data for the computer.

A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

The computer may operate in a networked or cloud-computing environment using logical connections to one or more remote devices, such as a remote computer. The remote computer may be a personal computer, a server, a router, a network PC, a peer device or other common network node, and typically includes many or all of the elements described above relative to the computer. The logical connections may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer may be connected to a public or private network through a network interface or adapter. In some embodiments, a modem or other means for establishing communications over the network. The modem, which may be internal or external, may be connected to the system bus via a network interface or other appropriate mechanism. A wireless networking component such as comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A controller adapted to:
   recognize an audio input from a user using an input interface;
   determine if a user gaze information from a gaze detector indicates that the user is gazing at a device of a plurality of devices; and
   when the user gaze information from the gaze detector indicates that the user is gazing at a first device:
   based on the user gaze information, activate a first interaction set of input commands recognizable by the controller and associated with the first device from a plurality of interaction sets, the plurality of interaction sets being associated with the plurality of devices, and in response to the audio input from the input interface route response information to the first device, and when the user gaze information from the gaze detector indicates that the user is gazing at a second device:

based on the user gaze information, activate a second interaction set of input commands recognizable by the controller and associated with the second device from the plurality of interaction sets, and in response to the audio input from the input interface route response information to the second device.

2. The controller of claim 1 further adapted to:
when user gaze information does not indicate that the user is gazing at the plurality of devices, provide a response to the input.

3. The controller of claim 2, the response to the input is an audio response.

4. The controller of claim 1, the audio input being a speech input, where the controller is further adapted to:
based on the user gaze information indicating that the user is gazing at the device, activate an interaction set of audio commands recognizable by the controller; and
respond, via the interaction set of audio commands, with a command corresponding to the speech input of the user.

5. The controller of claim 1, the audio input being a speech input, the speech input ambiguously matching a plurality of audio commands and the user gaze information indicating that the user is gazing at the device, the controller further adapted to:
based on the gaze information indicating that the user is gazing at the device, select an audio command from the plurality of audio commands based on the device.

6. The controller of claim 1 further adapted to receive gaze information from a plurality of users and speech inputs from the plurality of users.

7. The controller of claim 6 further adapted to activate a first interaction set based on a first gaze information for a first user and a second interaction set based on a second gaze information for a second user.

8. The controller of claim 7 further adapted to correlate a first audio command from the first user to the first gaze information and correlate a second audio command from the second user to the second gaze information.

9. A method, comprising:
receiving, by a gaze detector, a user gaze information;
receiving, by an input interface, an audio input from a user;
selecting at least one interaction set of a plurality of interaction sets recognizable by a controller based on the user gaze information received from the gaze detector; and
responding to the audio input from the input interface with a response based on the interaction set and the user gaze information.

10. The method of claim 9 further comprising selecting at least one input detector of the input interface from a plurality of input detectors based on the user gaze information.

11. The method of claim 9, the user gaze information including at least one of a user line of sight, a user point of focus, or an area that the user is not viewing.

12. The method of claim 9, the user gaze information identifying a device at which the user is looking.

13. The method of claim 12, the user gaze information further identifying a region of the device at which the user is looking.

14. The method of claim 9, the response including an audio response.

15. The method of claim 9, the response including a haptic response.

16. The method of claim 9, the user gaze information including a gaze duration.

17. The method of claim 9, selecting at least one an interaction set based on the user gaze information further comprising deselecting at least a second interaction set.

18. The method of claim 9, the audio input being a speech input.

19. The method of claim 9, the audio input further including a gesture input.

20. A system comprising:
an input interface, the input interface providing an audio input; and
a processor in data communication with the input interface, a gaze detector, and a storage device, the storage device having instructions stored thereon, which when executed by the processor, cause the processor to:
based on gaze information indicating that a user is gazing at a first device of a plurality of devices:
select a first interaction set corresponding to the first device,
process the audio input based on the first interaction set, and
route response information to the first device; and
based on gaze information indicating that a user is gazing at second first device of the plurality of devices:
select a second interaction set corresponding to the second device,
process the audio input based on the second interaction set, and
route response information to the second device.

* * * * *